United States Patent
Pudipeddi et al.

(10) Patent No.: US 8,433,677 B2
(45) Date of Patent: Apr. 30, 2013

(54) EXTENDING CLUSTER ALLOCATIONS IN AN EXTENSIBLE FILE SYSTEM

(75) Inventors: Ravisankar V. Pudipeddi, Bellevue, WA (US); Vishal V. Ghotge, Seattle, WA (US); Sarosh C. Havewala, Kirkland, WA (US); Ravinder S. Thind, Kirkland, WA (US); Mark J. Zbikowski, Woodinville, WA (US); David Goebel, Vashon, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/162,189

(22) Filed: Jun. 16, 2011

(65) Prior Publication Data

US 2011/0252076 A1 Oct. 13, 2011

Related U.S. Application Data

(63) Continuation of application No. 13/006,008, filed on Jan. 13, 2011, which is a continuation of application No. 11/752,872, filed on May 23, 2007, now Pat. No. 7,873,596.

(60) Provisional application No. 60/802,922, filed on May 23, 2006.

(51) Int. Cl.
*G06F 17/00* (2006.01)

(52) U.S. Cl.
USPC .................. 707/610; 707/614; 707/620

(58) Field of Classification Search .......... 707/610, 707/614, 620
See application file for complete search history.

(56) References Cited

U.S. PATENT DOCUMENTS

| | | | |
|---|---|---|---|
| 4,780,821 | A | 10/1988 | Crossley |
| 4,987,531 | A | 1/1991 | Nishikado et al. |
| 5,083,264 | A | 1/1992 | Platteter et al. |
| 5,086,502 | A | 2/1992 | Malcolm |
| 5,201,044 | A | 4/1993 | Frey, Jr. et al. |
| 5,202,982 | A | 4/1993 | Gramlich et al. |
| 5,297,148 | A | 3/1994 | Harari et al. |
| 5,307,494 | A | 4/1994 | Yasumatsu et al. |
| 5,313,646 | A | 5/1994 | Hendricks et al. |
| 5,359,725 | A | 10/1994 | Garcia et al. |
| 5,363,487 | A | 11/1994 | Willman et al. |

(Continued)

FOREIGN PATENT DOCUMENTS

| | | |
|---|---|---|
| EP | 0462587 | 12/1991 |
| EP | 0618540 | 3/1994 |

(Continued)

OTHER PUBLICATIONS

"Above Software Introduces Golden Retriever 2.0b", News Release, Dateline: Irvine California, Mar. 29, 1993, 1 page.

(Continued)

*Primary Examiner* — Sana Al Hashemi
(74) *Attorney, Agent, or Firm* — Woodcock Washburn LLP

(57) ABSTRACT

An extensible file system format for portable storage media is provided. The extensible file system format includes the specification of primary and secondary directory entry types that may be custom defined. The primary and secondary directory entry types can be further classified as critical and benign directory entries. The directory entry types can define whether a cluster chain corresponding to a file can be contiguously allocated.

12 Claims, 8 Drawing Sheets

U.S. PATENT DOCUMENTS

| | | | |
|---|---|---|---|
| 5,367,671 A | 11/1994 | Feigenbaum et al. | |
| 5,371,885 A | 12/1994 | Letwin | |
| 5,388,257 A | 2/1995 | Bauer | |
| 5,392,427 A | 2/1995 | Barrett et al. | |
| 5,412,808 A | 5/1995 | Bauer | |
| 5,421,001 A | 5/1995 | Methe | |
| 5,434,974 A | 7/1995 | Loucks et al. | |
| 5,437,029 A | 7/1995 | Sinha | |
| 5,469,562 A | 11/1995 | Saether | |
| 5,483,652 A | 1/1996 | Sudama | |
| 5,535,375 A | 7/1996 | Eshel et al. | |
| 5,537,636 A | 7/1996 | Uchida et al. | |
| 5,546,389 A | 8/1996 | Wippenbeck et al. | |
| 5,574,907 A | 11/1996 | Jernigan, IV et al. | |
| 5,579,517 A | 11/1996 | Reynolds et al. | |
| 5,596,755 A | 1/1997 | Pletcher et al. | |
| 5,627,996 A | 5/1997 | Bauer | |
| 5,694,606 A | 12/1997 | Pletcher et al. | |
| 5,699,548 A | 12/1997 | Choudhury et al. | |
| 5,732,268 A | 3/1998 | Bizzarri | |
| 5,734,340 A | 3/1998 | Kennedy | |
| 5,745,752 A | 4/1998 | Hurvig et al. | |
| 5,745,902 A | 4/1998 | Miller et al. | |
| 5,754,848 A | 5/1998 | Hanes | |
| 5,758,352 A | 5/1998 | Reynolds et al. | |
| 5,761,675 A | 6/1998 | Isenberg | |
| 5,761,677 A | 6/1998 | Senator et al. | |
| 5,765,169 A | 6/1998 | Conner | |
| 5,778,168 A | 7/1998 | Fuller | |
| 5,813,011 A | 9/1998 | Yoshida et al. | |
| 5,819,275 A | 10/1998 | Badger et al. | |
| 5,825,734 A | 10/1998 | Igarashi et al. | |
| 5,832,515 A | 11/1998 | Ledain et al. | |
| 5,850,506 A | 12/1998 | Gordons et al. | |
| 5,898,868 A | 4/1999 | Krueger et al. | |
| 5,907,672 A | 5/1999 | Matze et al. | |
| 5,923,884 A | 7/1999 | Peyret et al. | |
| 5,926,805 A | 7/1999 | Hurvig et al. | |
| 5,930,828 A | 7/1999 | Jensen et al. | |
| 5,983,240 A | 11/1999 | Shoroff et al. | |
| 6,023,744 A | 2/2000 | Shoroff et al. | |
| 6,032,223 A | 2/2000 | Beelitz | |
| 6,037,738 A | 3/2000 | Morita et al. | |
| 6,049,807 A | 4/2000 | Carroll et al. | |
| 6,055,527 A | 4/2000 | Badger et al. | |
| 6,078,999 A | 6/2000 | Raju et al. | |
| 6,081,804 A | 6/2000 | Smith | |
| 6,108,759 A | 8/2000 | Orcutt et al. | |
| 6,144,969 A | 11/2000 | Inokuchi et al. | |
| 6,194,432 B1 | 2/2001 | Slivka et al. | |
| 6,205,558 B1 | 3/2001 | Sobel | |
| 6,286,113 B1 | 9/2001 | Sembach et al. | |
| 6,374,265 B1 | 4/2002 | Chen et al. | |
| 6,374,268 B1 | 4/2002 | Testardi | |
| 6,377,958 B1 | 4/2002 | Orcutt | |
| 6,378,031 B1 | 4/2002 | Kuno et al. | |
| 6,470,345 B1 | 10/2002 | Doutre et al. | |
| 6,510,552 B1 | 1/2003 | Benayoun et al. | |
| 6,529,966 B1 | 3/2003 | Willman et al. | |
| 6,571,259 B1 | 5/2003 | Zheng et al. | |
| 6,594,725 B2 | 7/2003 | Ando et al. | |
| 6,615,365 B1 | 9/2003 | Jenevein et al. | |
| 6,615,404 B1 | 9/2003 | Garfunkel et al. | |
| 6,658,437 B1 | 12/2003 | Lehman | |
| 6,662,309 B2 | 12/2003 | Ando et al. | |
| 6,675,180 B2 | 1/2004 | Yamashita | |
| 6,792,518 B2 | 9/2004 | Armangau et al. | |
| 6,856,993 B1 | 2/2005 | Verma et al. | |
| 6,883,114 B2 | 4/2005 | Lasser | |
| 6,907,184 B1 | 6/2005 | Yokota et al. | |
| 6,922,708 B1 | 7/2005 | Sedlar | |
| 7,051,251 B2 | 5/2006 | Moore et al. | |
| 7,062,602 B1 | 6/2006 | Moore et al. | |
| 7,072,917 B2 | 7/2006 | Wong et al. | |
| 7,089,448 B2 | 8/2006 | Hinshaw et al. | |
| 7,174,420 B2 | 2/2007 | Malueg et al. | |
| 7,274,857 B2 | 9/2007 | Nallur et al. | |
| 7,363,540 B2 | 4/2008 | Patel et al. | |
| 7,380,140 B1 * | 5/2008 | Weissman et al. | 713/193 |
| 7,383,288 B2 | 6/2008 | Miloushev et al. | |
| 7,613,738 B2 | 11/2009 | Patel et al. | |
| 7,620,620 B1 | 11/2009 | Sedlar | |
| 7,676,491 B2 | 3/2010 | Jansen et al. | |
| 7,685,171 B1 | 3/2010 | Beaverson et al. | |
| 7,747,664 B2 | 6/2010 | Patel et al. | |
| 7,757,100 B2 | 7/2010 | Weissman et al. | |
| 7,873,596 B2 | 1/2011 | Pudipeddi et al. | |
| 7,941,435 B2 | 5/2011 | Kao et al. | |
| 7,979,409 B2 | 7/2011 | Kime | |
| 8,001,165 B2 | 8/2011 | Patel et al. | |
| 8,024,383 B2 | 9/2011 | Patel et al. | |
| 8,024,507 B2 | 9/2011 | Patel et al. | |
| 8,156,165 B2 | 4/2012 | Malueg et al. | |
| 2001/0016841 A1 | 8/2001 | Karasudani | |
| 2001/0054129 A1 | 12/2001 | Wouters | |
| 2002/0062301 A1 | 5/2002 | Rudoff et al. | |
| 2002/0152354 A1 | 10/2002 | Harmer | |
| 2003/0028765 A1 | 2/2003 | Cromer et al. | |
| 2003/0088587 A1 | 5/2003 | Merrells | |
| 2003/0135650 A1 | 7/2003 | Kano et al. | |
| 2003/0177107 A1 | 9/2003 | Brown et al. | |
| 2003/0182330 A1 | 9/2003 | Manley et al. | |
| 2003/0221095 A1 | 11/2003 | Gaunt et al. | |
| 2003/0233385 A1 | 12/2003 | Srinivasa et al. | |
| 2004/0030847 A1 | 2/2004 | Tremaine | |
| 2004/0064483 A1 | 4/2004 | Bulka et al. | |
| 2004/0078704 A1 | 4/2004 | Malueg et al. | |
| 2004/0210706 A1 | 10/2004 | In et al. | |
| 2004/0215600 A1 | 10/2004 | Aridor | |
| 2004/0250172 A1 | 12/2004 | Patel et al. | |
| 2005/0015354 A1 | 1/2005 | Grubbs | |
| 2005/0027746 A1 | 2/2005 | Lin et al. | |
| 2005/0060316 A1 | 3/2005 | Kamath et al. | |
| 2005/0172005 A1 | 8/2005 | Goodwin | |
| 2006/0020745 A1 | 1/2006 | Conley et al. | |
| 2006/0136529 A1 | 6/2006 | Pudipeddi et al. | |
| 2006/0224578 A1 | 10/2006 | Kadatch et al. | |
| 2007/0136387 A1 | 6/2007 | Malueg et al. | |
| 2007/0239957 A1 | 10/2007 | Lin | |
| 2008/0091702 A1 | 4/2008 | Pudipeddi et al. | |
| 2008/0168029 A1 | 7/2008 | Pudipeddi et al. | |
| 2008/0172425 A1 | 7/2008 | Patel et al. | |
| 2008/0172426 A1 * | 7/2008 | Patel et al. | 707/205 |
| 2008/0177939 A1 | 7/2008 | Patel et al. | |
| 2008/0215646 A1 | 9/2008 | Pudipeddi et al. | |
| 2008/0215647 A1 | 9/2008 | Pudipeddi et al. | |
| 2009/0164440 A1 | 6/2009 | Pudipeddi et al. | |
| 2009/0164539 A1 | 6/2009 | Pudipeddi et al. | |
| 2009/0265400 A1 | 10/2009 | Pudipeddi et al. | |
| 2010/0049776 A1 | 2/2010 | Patel et al. | |
| 2010/0217788 A1 | 8/2010 | Patel et al. | |
| 2012/0011177 A1 | 1/2012 | Patel et al. | |
| 2012/0011179 A1 | 1/2012 | Patel et al. | |

FOREIGN PATENT DOCUMENTS

| | | |
|---|---|---|
| EP | 1677214 | 7/2006 |
| JP | 64-041039 | 2/1989 |
| JP | 01-315843 | 12/1989 |
| JP | 02-148341 | 6/1990 |
| JP | 03-017753 | 1/1991 |
| JP | 04-188239 | 7/1992 |
| JP | 60-19763 | 1/1994 |
| JP | 07-234879 | 9/1995 |
| JP | 2001-160068 | 6/2001 |
| JP | 2001325134 | 11/2001 |
| JP | 2004-288007 | 10/2004 |
| RU | 2159467 | 11/2000 |

OTHER PUBLICATIONS

"File Sharing Protocol", Microsoft Corporation, Nov. 7, 1988, 71 pages.

"Long Filenames", Article 15, Windows 95 Beta 2 Release SDK, Oct. 28, 1994, 19-47.

"The Intelligent Way to Search", News Release, Dateline: Burlington Massachusetts, Oct. 1987, 1 page.

"World Software Corporation (WSC) Launches Extend-a-Name in Europe", Lexis Nexis, Computer Product Update, Jul. 27, 1990, 2 pages.

Bonner, "Build a Document Manager Under Windows", PC Computing, Dec. 1991, 4(12), 275-284.

Bonner, "What's in a Name?", PC Computing, Gale Group, Sep. 1989, 2(9), 169-170.

Duncan, "Design Goals and Implementation of the New High Performance File Systems", Microsoft Systems Journal, Sep. 1989, 4(5), 1-13.

Duncan, "Power Programming Using Long Filenames and Extended Attributes, Part I", PC Magazine, Apr. 24, 1990, 9(8), 317-322.

Duncan, "Power Programming Using Long Filenames and Extended Attributes, Part II", PC Magazine, May 15, 1990, 9(9), 305-310.

Glass, "Create Your Own Environment", PC Computing, Oct. 1990, 3(10), 106-110.

Hurwicz, "MS-DOS 3.1 Makes it Easy to Use IBM PCs on a Network", Data Communications, Nov. 1985, 223-237.

Karpovich et al., "Extensible File System (ELFS): An Object-Oriented Approach to High Performance File I/O", OOPSLA 1994—Proceedings of the Ninth Annual Conference on Object-Oriented Programming Systems, Language and Applications, ACM SIGPLAN Notices, Oct. 1994, 29(10), 191-204.

Khalidi et al., "Extensible File System in Spring", Sun Microsystems Laboratories, Inc., Sep. 1993, 1-18.

Leffler et al., "The Design and and Implementation of the 4.3BSD UNIX Operating System", Addison-Wesley Publishing Company, 1989, Chapter 2, Design Overview of 4.3BSD, 34-36.

Lent et al., "New, Improved Windows", PC World, Dec. 1993, 11(12), 252-269.

Mallory, "Breakthrough on DOS Filename Limites", Newsbytes News Network, Apr. 12, 1993, 1 page.

McCormick, "Presentation Manager Under OS/2 Encourages Lengthy Name-Calling", Government Computer News, May 14, 1990, 9(10), 16 and 18.

O'Malley, "Fetching Desktop Files: Standalone Document Managers", Window Sources, Mar. 1993, 1(2), 443-444.

Rohan, "Golden Retriever Fetches Files in Windows", Computer Shopper, Nov. 1992, 12(11), 947.

Tanenbaum, "MINIX Operating System", Keiichiro Sakamoto, Tokyo, Japan, 1989, Chapter 5, "File System", 310-313 (English Translation of Japanese Publication).

Tanenbaum, "Modern Operating Systems", 2nd ed., Prentice Hall, Englewood Cliffs, NJ, 2001, 442-445, 830-834, 835-839.

Trivette, "Utility Provides 60-Character Filenames", PC Magazine, Sep. 27, 1988, 7(16), 56.

Wang, "Universal_File_Names for Ada", Ada Letters, Jan./Feb. 1990, 10(1), 111-117.

Farr, et al., "An Optimum Disc Organization for a Virtual Memory System", Computer Design, Jun. 1971, pp. 49-54.

Lee, "Server-Based Maintenance Approach for Computer Classroom Workstations", IEICE Trans. Inf. & Syst., vol. E83-D, No. 4, Apr. 2000, pp. 807-815.

Microsoft Press Computer Dictionary Third Edition, "Flush", Microsoft Press, 1997, p. 202.

Microsoft Press computer Dictionary Third Edition, "Fragmentation", Microsoft Press, 1997, p. 206.

Jonge, et al., "The Logical Disk: A New Approach to Improving File Systems", ACM, 1993, pp. 15-28.

"Transactional file access", Date: Jun. 2, 2005, http://jakarta.apache.org/commons/transaction/file/index.html.

Rich Amy, "ZFS, Sun's Cutting-Edge File System (Part 1: Storage Integrity, Security, and Scalability)", Date: Aug. 2006, http://www.sun.com/bigadmin/features/articles/zfs.sub.part1.scalable.html-#transaction.

Chen, et al., "The Rio File Cache: Surviving Operating System Crashes", Date: Oct. 1996, http://www.cs.ucsd.edu/classes/wi01/cse221/chen,ng,rajamani,aycock.the.su- b.--rio-file.sub.--cache.surviving.sub.--operating.sub.--system.sub.--cras- hes.pdf.

Kashyap, Aditya, "File System Extensibility and Reliability Using an in-Kernel Database", Date: Dec. 2004, http://www.am-utils.org/docs/kbdbfs-msthesis/index.html.

Barreto et al., "A Highly Available Replicated File System for Resource-Constrained Windows CE .Net Devices", In 3rd International Conference on .Net Technologies, May 2005.

"Transaction-Safe FAT File System", http://msdn.microsoft.com/library/defaultasp?url=/library/en-us/wcemain4-/html/cmcontransaction-safefatfilesystem.asp, last updated May 30, 2006.

Otoo et al., "Non-shared disk cluster—a fault tolerant, commodity approach to hi-bandwidth data analysis", Sep. 2001, available at http://www.ihep.ac.cn/.about.chep01/paper/4-026.pdf.

Sivathanu et al., "Life or Death at Block-Level", In Proceedings of the 6th Symposium on Operating Systems Design and Implementation (OSDI '04), Dec. 2004.

* cited by examiner

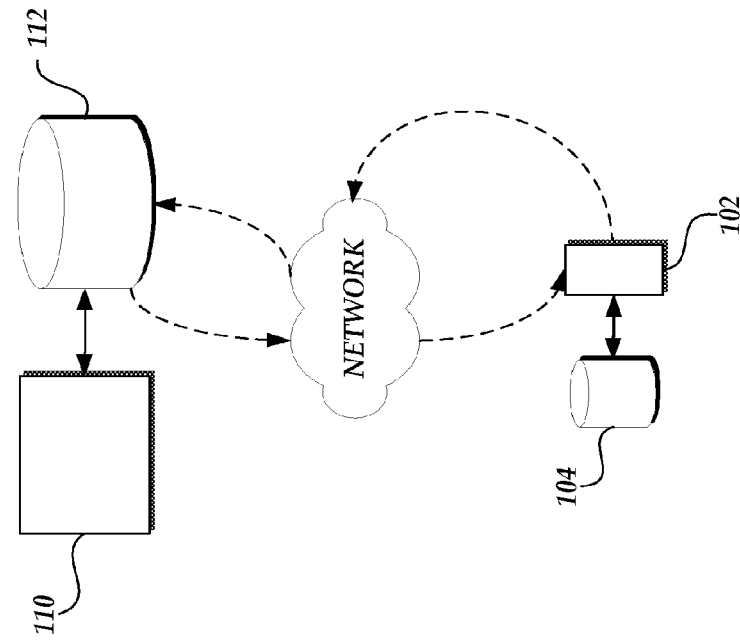
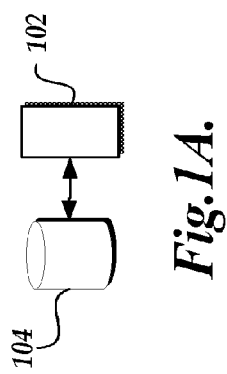
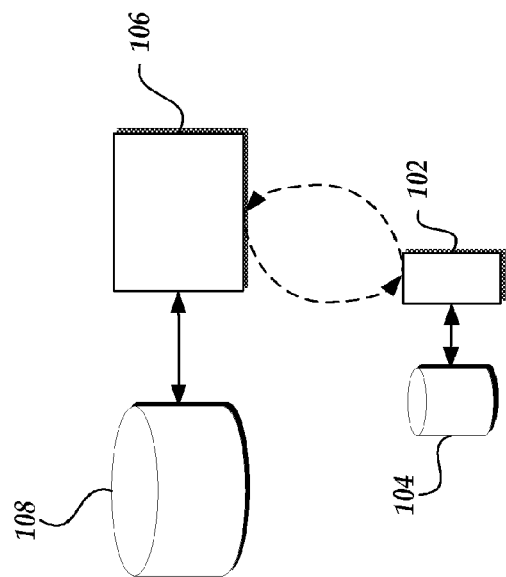

| NAME | SIZE |
|---|---|
| IN USE | 1:1 |
| TYPE | 1:7 |
| CHARACTERS | 1 |
| NAME HASH | 2 |
| FILE NAME | 28 |

| NAME | SIZE |
|---|---|
| IN USE | 1:1 |
| TYPE | 1:7 |
| SECONDARY ENTRIES | 1 |
| GUID | 16 |

| NAME | SIZE |
|---|---|
| OEM NAME | 3 |
| DATA SIZE DESCRIPTORS | X |
| ACTIVE FAT | 2 |
| VOLUME SERIAL NUMBER | 4 |
| FILE SYSTEM TYPE | X |

| NAME | SIZE |
|---|---|
| IN USE | 1:1 |
| TYPE | 1:7 |
| SECONDARY ENTRIES | 1 |
| ATTRIBUTES | 2 |
| TIME | X |
| TIME ZONE | 1 |

| NAME | SIZE |
|---|---|
| IN USE | 1:1 |
| TYPE | 1:7 |
| SECONDARY ENTRIES | 1 |
| GUID | 16 |
| ALLOCATION FLAG | 1 |
| OTHER | X |

| NAME | SIZE |
|---|---|
| IN USE | 1:1 |
| TYPE | 1:7 |
| SECONDARY | 16 |
| GUID | 16 |
| ALLOCATION FLAG | 1 |
| OTHER | X |

| NAME | SIZE |
|---|---|
| IN USE | 1:1 |
| TYPE | 1:7 |
| ACL INFORMATION | X |

- 1000
- 1002
- 1004
- 1006

EXTENDING CLUSTER ALLOCATIONS IN AN EXTENSIBLE FILE SYSTEM

CROSS-REFERENCE TO RELATED APPLICATIONS

This application is a continuation of U.S. application Ser. No. 13/006,088, filed Jan. 13, 2011, entitled Extending Cluster Allocations in an Extensible File System, which is a continuation of U.S. Pat. No. 7,873,596, filed May 23, 2007, entitled Extending Cluster Allocations in an Extensible File System, and claims the benefit of U.S. Provisional Application No. 60/802,922, entitled Naming Protocol for Extensible File System, filed May 23, 2006, each of which is incorporated herein by reference in its entirety.

BACKGROUND

Generally described, there are a number of portable computing devices, such as digital still cameras, digital video cameras, media players, mobile phones, mobile computing devices, personal digital assistants, and the like that maintain data on a storage media, such as a portable storage media. The continued development of more complex portable computing devices and larger storage capacity portable storage media places a greater demand for flexibility on the file system format used on the storage media. Current file system format approaches can become deficient in that they do not provide adequate flexibility for increasing storage size capacities and/or storage media applications.

In one embodiment, extensible file systems may be utilized in these embodiments to allow for increased storage size capacities and application to storage media application. In one embodiment of an extensible file system, data may be stored in allocated clusters within a file system. As the amount of data increases, the number of allocated clusters may also increase. Accordingly, in these embodiments, each new allocated cluster would likely be added as a new entry in the file system, such as an additional entry in a file allocation table. The additional allocation and management of each separate cluster in an allocation can become inefficient for file system management.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An extensible file system format for portable storage media is provided. The extensible file system format includes the specification of primary and secondary directory entry types that may be custom defined. The primary and secondary directory entry types can be further classified as critical and benign directory entries. The directory entry types can define whether a cluster chain corresponding to a file can be contiguously allocated.

A computer-readable medium having computer-executable components for storing data is provided. The components include a boot parameters component for specifying boot parameters for a file system. The components also include a file allocation table component for defining a file allocation table associated with the file system. The components further include two or more primary directory entry components for specifying data in a root directory of the file system. At least one primary directory entry component includes a flag corresponding to an indication of a contiguous cluster chain. Finally, the components include at least one secondary entry component corresponding to the primary directory entry component and defining meta data associated with the primary directory entry component.

In accordance with another aspect, a method for managing data organized into a plurality of clusters is provided. In accordance with the method, a request for an extension of a plurality of clusters is obtained. A determination is made whether the set of clusters can be contiguously allocated. If the set of clusters can be contiguously allocated, a cluster chain size allocation is updated in accordance with the size of the request for the extension. If the set of clusters cannot be contiguously allocated, entries are made in the file allocation table for each cluster in the cluster chain.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1A-1C are block diagrams illustrative of an illustrative environment including a portable computing device and a storage device implementing the extensible file system format in accordance with an aspect of the present invention;

FIG. 4 is a block diagram illustrative of data components for implementing a boot process block in an extensible file system format in accordance with an aspect of the present invention;

FIG. 5 is a block diagram illustrative of data components for implementing directory entries in an extensible file system format in accordance with an aspect of the present invention FIG. 6 is a block diagram illustrative of data components for implementing a file name and extensions in an extensible file system format in accordance with an aspect of the present invention;

FIG. 7 is a block diagram illustrative of data components for implementing a volume identifier in an extensible file system format in accordance with an aspect of the present invention;

FIG. 8 is a block diagram illustrative of data components for implementing an extensible directory entry in an extensible file system format in accordance with an aspect of the present invention;

FIG. 9 is a block diagram illustrative of data components for implementing an extensible directory entry in an extensible file system format in accordance with an aspect of the present invention;

FIG. 10 is a block diagram illustrative of data components for implementing an access control list in an extensible file system format in accordance with an aspect of the present invention;

DETAILED DESCRIPTION

Figure 2:
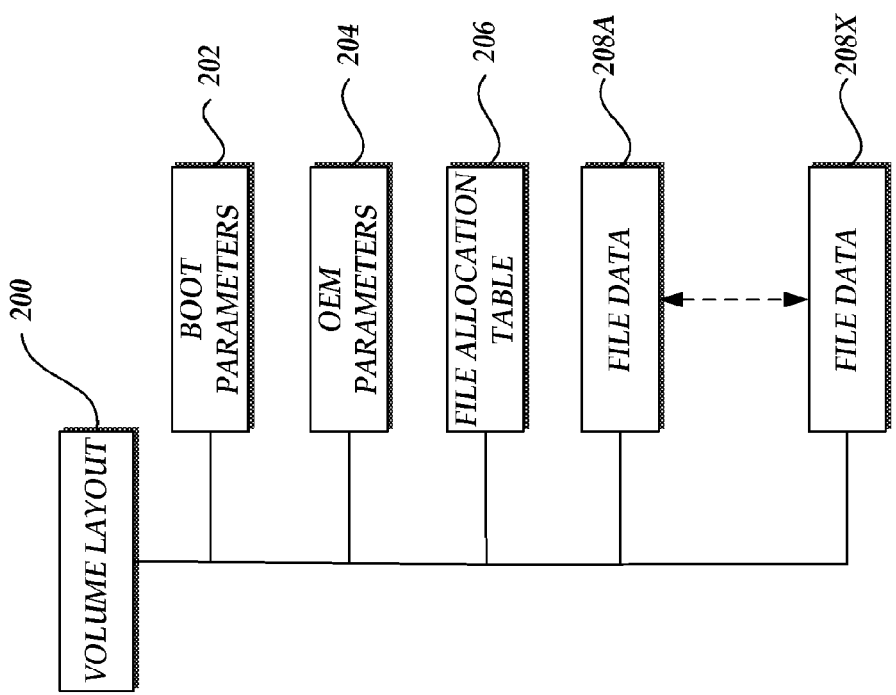
FIG. 2 is a block diagram illustrative of various volume layout components corresponding to an extensible file system format in accordance with an aspect of the present invention.

Generally described, the present invention relates to an extensible file system format and various processes associated with the extensible file system format. In an illustrative embodiment, the extensible file system format corresponds to an extensible file system format for portable storage media and various processes associated with the extensible file system format on the portable storage media. More specifically, in an embodiment, processes and data structures are provided for facilitating the storage and management of file data in contiguous data clusters. Although the present invention will be described with regard to a portable storage media file system format, one skilled in the relevant art will appreciate that the disclosed embodiments are illustrative in nature and should not be construed as limiting. Additionally, one skilled in the relevant art will appreciate that the data structures and data layouts used in the illustrative examples may require additional information related to performance, security, and the like.

FIGS. 1A-1C are block diagrams illustrative of various operating environments 100 for the extensible file system format of the present invention. With reference to FIG. 1A, in an illustrative embodiment, the extensible file system format is utilized to store data from a computing device, such as a mobile computing device 102, and a storage media, such as a portable storage media 104. In an illustrative embodiment, the mobile computing device 102 can correspond to any one of a variety of computing devices, including but not limited to, portable computing devices, mobile telephones, personal digital assistants, music players, media players. The portable storage media can also include, but is not limited to, hard drives, flash media, micro-drives and other storage media. In an illustrative embodiment, the extensible file system on the portable storage media 104 does not have to include any type of executable or readable software components, such as an operating environment, utilized by the mobile computing device 102. Alternatively, the extensible file system on the portable storage media 104 may include executable or readable software components used by the mobile device 102.

In an illustrative embodiment, the mobile computing device 102 may be in communication with other computing devices for collecting/exchanging data to be stored on the portable storage media 104. With reference to FIG. 1B, the mobile computing device 102 may be in direct communication with another computing device 106 and storage media 108. In an illustrative embodiment, the direct communication can correspond to various wired and wireless communication methods. In an illustrative embodiment, the other storage media 108 is not required to be formatted in accordance with the extensible file system format of the present invention. With reference to FIG. 1C, in a similar manner, the mobile computing device 102 may also be in communication with another computing device 110 and storage media 112, via a network connection. In an illustrative embodiment, the network connection can correspond to local area network (LAN) and wide are network (WAN) connections.

With reference now to FIG. 2, an illustrative embodiment volume layout 200 for an extensible file system format will be described. The volume layout 200 includes a boot parameters component 202 that include various information related to a description of the file system parameters of the partition. In an illustrative embodiment, the boot parameters component 202 can include code for bootstrapping from a defined partition, fundamental file system parameters for the defined partition, and various error checking information. A data structure for defining at least a portion of the boot parameters will be described below with regard to FIG. 4.

The volume layout 200 also includes an extensible parameters component, designated as OEM parameters 204, that define various additional data structures used in conjunction with the file system. In an illustrative embodiment, an original equipment manufacture (OEM) may specify various extensible data structures, such as performance parameters for a storage medium, that can be defined at time of manufacture. The volume layout 200 can further include a file allocation table component 206 that defines file and directory allocations. In an illustrative embodiment, each entry in the file allocation table component 206 corresponds to a 32-bit entry that represents an allocated cluster, an unallocated cluster or an unusable cluster. As will be explained in greater detail below, in an illustrative embodiment, contiguously allocated clusters will not require a separate entry for each allocated cluster in the file allocation table component 206. The volume layout 200 can still further include series of file data components 208A-208X that correspond to the data stored according to the file system format. Various data structures for defining a portion of the file data components 208A-208X will be defined with regard to FIGS. 3-10.

Figure 3:
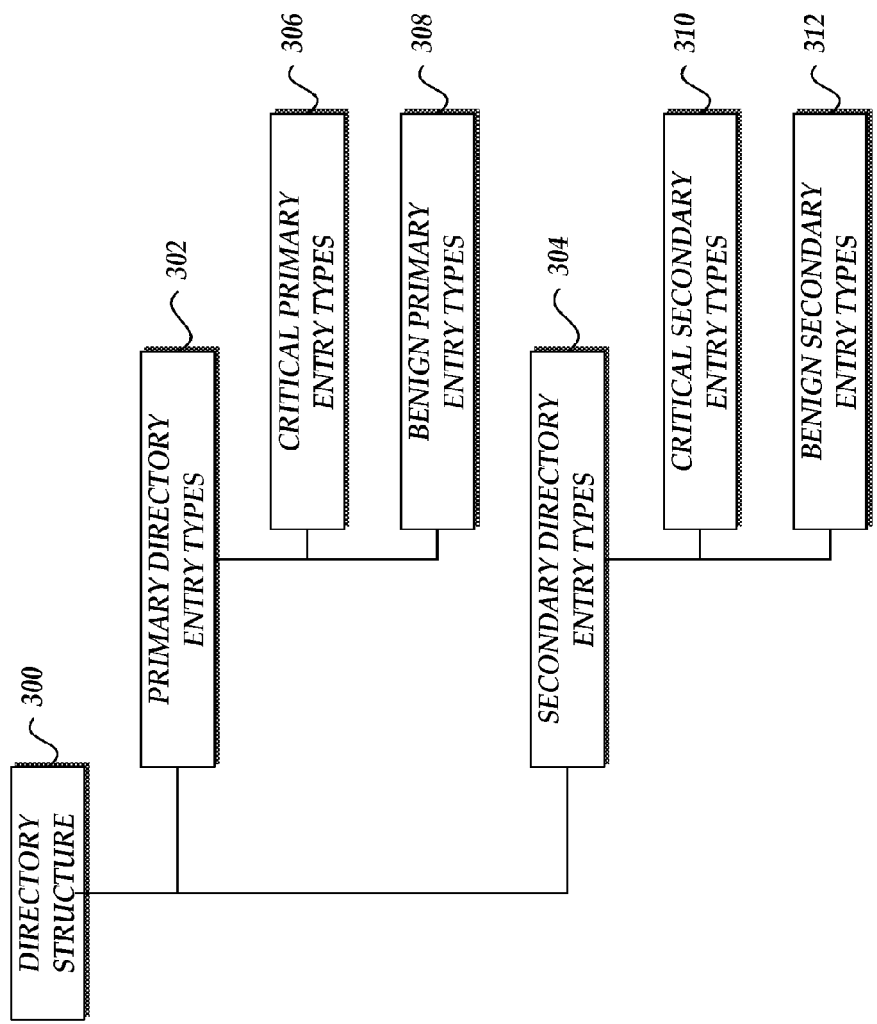
FIG. 3 is a block diagram illustrative of an extensible file system directory structures including primary and secondary directory entry structures in accordance with an aspect of the present invention.

Turning now to FIG. 3, in one aspect, the file data components 208 may include one or more directory entries according to a directory structure 300. In an illustrative embodiment, the directory structure 300 is organized into primary directory entries 302 and secondary directory entries 304. Each directory entry in the primary and secondary entries is typed. For example, in an illustrative embodiment, type values for the primary and secondary directory entries can correspond to a range of 1-255. Primary directory entries 302 correspond to the entries in the root directory of the file system. Secondary directory entries 304 follow a primary directory entry and are associated with the primary directory entry. Secondary directory entries extend the metadata associated with the correlated primary directory entry.

With continued reference to FIG. 3, in an illustrative embodiment, the primary directory entries 302 can be further classified as critical primary directory entries 306 and benign primary directory entries 308. Critical primary directory entries 306 define potentially different formats for each directory entry. In an illustrative embodiment, an operating environment will not mount a volume corresponding to the extensible file system format with an unknown critical primary directory entry, as will be described below. Examples of known primary directory entries 306 can include allocation bitmaps, up-case tables, volume labels, encryption keys, and normal directory entries. Benign primary directory entries 308 also define potential different formats for each directory entry, but can be ignored by the file system if a particular benign primary directory entry is not understood. Benign primary directory entries 308 can be associated with another cluster chain in the volume and can be contiguously allocated. For example, a contiguously allocated benign primary directory entry can be identified through the setting of a corresponding flag. Additionally, benign primary directory entries 308 can also be associated with a number of secondary directory entries 304.

In a manner similar to primary directory entries 302, secondary directory entries 304 may also be further classified as critical secondary directory entries 310 and benign secondary directory entries 312. As described above, the critical secondary directory entries 310 and benign secondary directory entries 312 are associated with a benign primary directory entry and extend the metadata associated with the primary directory entry. Both the critical secondary directory entries 310 and the benign secondary directory entries 312 can be associated with another cluster chain in the volume and can be contiguously allocated.

To mount a volume corresponding to the extensible file system format, the file system implements a mount volume procedure. In an illustrative embodiment, the mount volume procedure attempts to look at a version number for the volume. If the version number is not understood (e.g., the version number is higher), the volume will not be mounted. During a normal directory enumeration, any critical primary directory entries not known by the file system will prevent the volume from being mounted. Thereafter, various user-initiated processes, such as a file open, will cause the file system to enumerate the secondary directory entries. If the critical secondary directory entries 310 are not known by a file system, the entire directory entry will be skipped. Additionally, if benign secondary directory entries 312 are not known by the file system, the particular unknown benign secondary directory entry will be ignored.

With reference now to FIG. 4, a block diagram illustrative of data components 400 for implementing a boot process block in the boot parameters component 202 (FIG. 2) will be described. The data components 400 include an OEM name component 402 for specifying a name for the file system format of the storage media. The data components 400 also include a data size descriptor component 404 for specifying various characteristics of the data stored in the file system. For example, the data size descriptor component 404 can specify a count of bytes per sector, a number of sectors per allocation unit, a file allocation table ("FAT") table offset, and a count of sectors for all data structures. The data components include an active FAT flags component 406 for specifying a number of active FATs on the file system. In an illustrative embodiment, a file system may support multiple FATs for utilization with some operating system environments. The data components 400 can further include a volume identification component 408 for identifying a volume serial number and/or version number. Still further, the data components 400 can include a file system type for specifying the file system format for the file system. One skilled in the relevant art will appreciate that the data components 400 can include a number of additional/alternative rows for implementing the above-identified components 402-410 and additional components.

Turning now to FIG. 5, a block diagram illustrative of data components 500 for implementing directory entries in an extensible file system format will be described. The data components 500 include an in use component 502 for specifying whether the particular directory entry is in use. In an illustrative embodiment, the high bit of the data components will be set to "1" if the directory entry is in use. The data components 500 further include a type designation component 504 for specifying that the directory entry is associated with a normal directory entry. The data components 500 further include a secondary directory entries component 504 for specifying a number of secondary entries associated with the normal directory entry. The data components 500 also include a file attributes component 508 for specifying various file system attributes for the directory entry. Still further, the data components 500 include a time component 510 for specifying various time information such as a creation timestamp, modification time stamp and other time information. Additionally, the data components 500 further include a time zone component 512 for specifying a time zone for the last created time stamp. One skilled in the relevant art will appreciate that the data components 500 can include a number of additional/alternative rows for implementing the above-identified components 502-512 and additional components.

Turning now to FIG. 6, a block diagram illustrative of data components 600 for implementing a file name and extensions will be described. The data components 600 include an in use component 602 for specifying whether the particular directory entry is in use. In an illustrative embodiment, the high bit of the data components will be set to "1" if the directory entry is in use. The data components 600 further include a type designation component 604 for specifying that the directory entry is associated with a file system name. The data components further include a file name length component 606 and a file name hash component 608. The utilization of the file name hash component 608 will be described below. The data components 600 also include a file name component 610 for specifying the file name. One skilled in the relevant art will appreciate that the data components 600 can include a number of additional/alternative rows for implementing the above-identified components 602-610 and additional components. Additionally, file name directory entries may be extended by secondary directory entries.

Turning now to FIG. 7, a block diagram illustrative of data components 700 for implementing a volume identifier in an extensible file system format is provided. The data components 700 include an in use component 702 for specifying whether the particular directory entry is in use. In an illustrative embodiment, the high bit of the data components will be set to "1" if the directory entry is in use. The data components 700 further include a type designation component 704 for specifying that the directory entry is associated with a volume identifier. The data components 700 further include a secondary directory entries component 706 for specifying a number of secondary entries associated with the volume identifier. The data components 700 also include a volume identifier 708, such as a global unique identifier. One skilled in the relevant art will appreciate that the data components 700 can include a number of additional/alternative rows for implementing the above-identified components 702-708 and additional components. Additionally, in an illustrative embodiment, the data components 700 correspond to a benign directory entry that can be ignored by a file system that does not support volume identifiers.

With reference now to FIGS. 8 and 9, in an illustrative embodiment, parties, such as an OEM, may be able to define specific benign primary directory entry types 308 and benign secondary directory entry types 312. As discussed above, in the event the file system would not recognize or understand either the specific benign primary directory entry types 308 or benign secondary directory entry types 312, the file system could ignore the defined directory entry types.

With reference to FIG. 8, a block diagram illustrative of data components 800 for implementing an extensible benign primary directory entry 308 in an extensible file system format will be described. The data components 800 include an in use component 802 for specifying whether the particular directory entry is in use. In an illustrative embodiment, the high bit of the data components will be set to "1" if the directory entry is in use. The data components 800 further include a type designation component 804 for specifying that the directory entry is a benign primary directory entry. The data components 800 further include a secondary directory entries component 806 for specifying a number of secondary entries associated with the volume identifier. The data components 800 also include a volume identifier 808, such as a global unique identifier. The data components 800 can further include a flag component 810 that corresponds to an indication of whether contiguous allocation of a cluster chain is to be implemented. The data components 800 can still further include additional information 812, such as verification information and a starting cluster. As will be explained in greater detail below, cluster chains utilizing contiguous allocation can be defined according to cluster chain size and a starting cluster for the first cluster in the cluster chain. One skilled in the relevant art will appreciate that the data components 800 can include a number of additional/alternative rows for implementing the above-identified components 802-812 and additional components.

With reference to FIG. 9, a block diagram illustrative of data components 900 for implementing a benign secondary directory entry in an extensible file system format will be described. The data components 900 include an in use component 902 for specifying whether the particular directory entry is in use. In an illustrative embodiment, the high bit of the data components will be set to "1" if the directory entry is in use. The data components 900 further include a type designation component 904 for specifying that the directory entry is a benign primary directory entry. The data components 900 further include a secondary directory entries component 906 for specifying a number of secondary entries associated with the volume identifier. The data components 900 also include a volume identifier 908, such as a global unique identifier. The data components 900 can further include a flag component 910 that corresponds to an indication of whether contiguous allocation of a cluster chain is to be implemented. The data components 900 can further include additional information 912, such as verification information and a starting cluster. One skilled in the relevant art will appreciate that the data components 900 can include a number of additional/alternative rows for implementing the above-identified components 902-912 and additional components.

In an illustrative embodiment, a benign primary directory entry and/or secondary directory entries may be associated with access control list (ACL) information. FIG. 10 is a block diagram illustrative of data components 1000 for implementing an access control list in an extensible file system format. The data components 1000 include an in use component 1002 for specifying whether the particular directory entry is in use. In an illustrative embodiment, the high bit of the data components will be set to "1" if the directory entry is in use. The data components 1000 further include a type designation component 1004 for specifying that the directory entry is an ACL directory entry. The data components 1000 further include a number of ACL fields 1006, such as ACL flags, pointers to ACL databases, and the like. One skilled in the relevant art will appreciate that the data components 1000 can include a number of additional/alternative rows for implementing the above-identified components 1002-1006 and additional components.

In accordance with an aspect of the invention, the utilization of contiguously allocated clusters in a cluster chain mitigates the need for traversing the file allocation table component 206 to identify the clusters in the cluster chain. Because the clusters will be contiguously allocated, each cluster in the chain can be identified with knowledge of the starting location of the first cluster in the chain and the total cluster chain size. For example, assume that each cluster has a size of 4 K of data and that the total allocation for a cluster chain is 18 K of data. The cluster chain will require five clusters to capture the data. If the first cluster begins at cluster position 40, then cluster positions 41, 42, 43 and 44 would be taken by the remaining four contiguously allocated clusters in the cluster chain.

Figure 11:
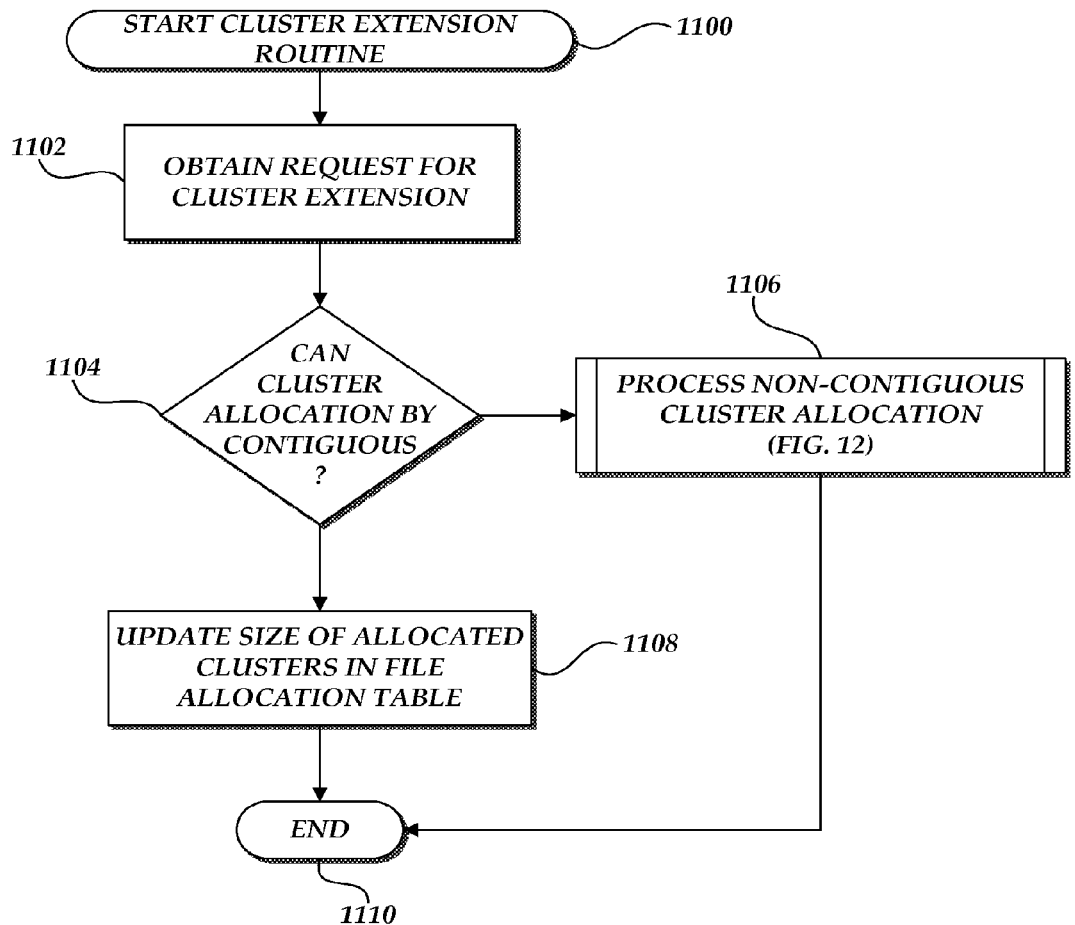
FIG. 11 is a flow diagram illustrative of a cluster chain extension routine for an extensible file system format in accordance with an aspect of the present invention.

In addition to the storage and processing of contiguously allocated clusters, additional processes may be utilized in the extension of a cluster chain. With reference now to FIG. 11, a cluster chain extension routine 1100 for an extensible file system format will be described. At block 1102, a request for extending or modifying the cluster chain is obtained. In an illustrative embodiment, the request for the extension of the cluster chain can correspond to the addition, substitution, modification or rewriting of data.

At decision block 1104, a test is conducted to determine whether the contiguous allocation is available for the cluster chain associated with the request. In an illustrative embodiment, the determination of whether contiguous allocation is available can correspond to a determination of whether the first cluster in the cluster chain includes the contiguous allocation flag set in the flag components (810 or 910). In another embodiment, the determination of whether contiguous allocation is available can correspond to a determination of whether additional contiguous clusters are available. In this embodiment, the last cluster in the cluster chain can be located by identifying the first cluster in the cluster chain and determining the cluster chain size. The determination can check whether contiguous clusters are available, such as by referring to the allocation bitmap.

If contiguous allocation is not available, at block 1106, the entire cluster chain is subject to a noncontiguous allocation. A subroutine for allocating a cluster chain in a noncontiguous manner will be described below with regard to FIG. 12. Alternatively, if contiguous allocation is available, at block 1108, the cluster chain size is updated to reflect the additional cluster. The routine 1100 terminates at block 1110.

Figure 12:
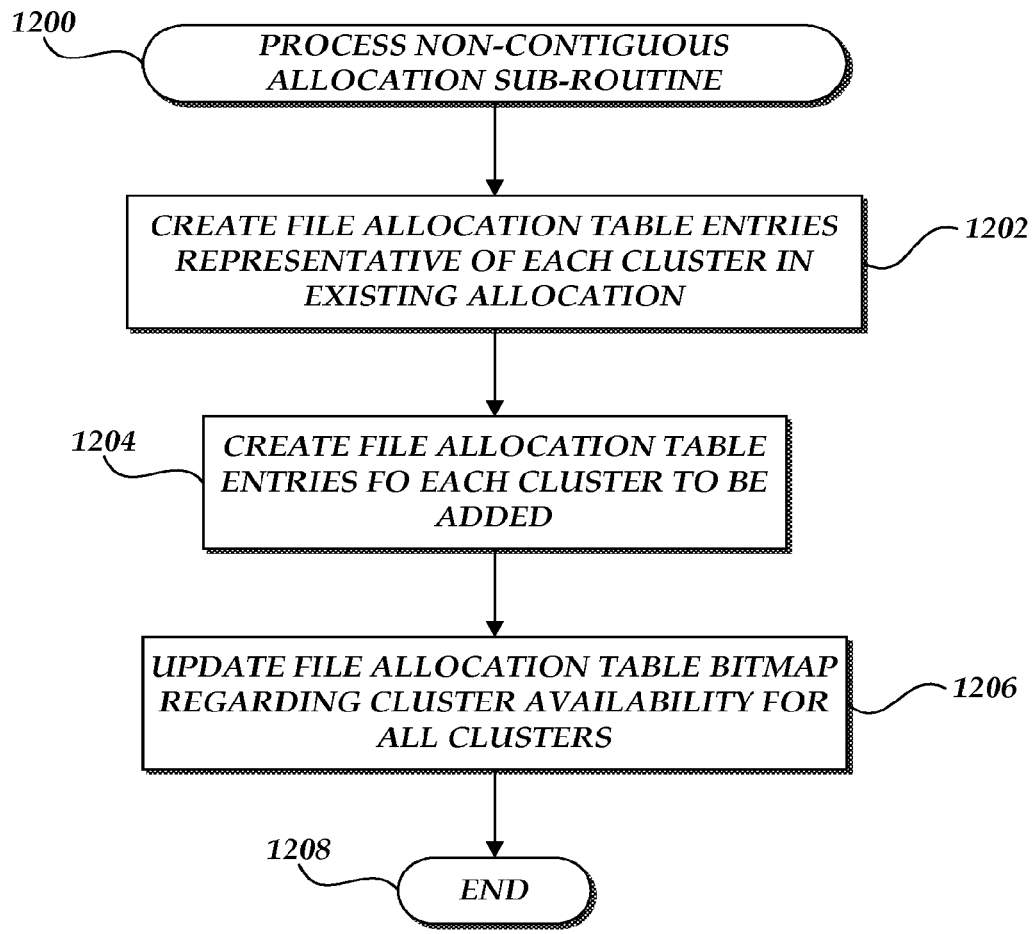
FIG. 12 is a flow diagram of a non-contiguous cluster allocation sub-routine for an extensible file system format in accordance with an aspect of the present invention.

With reference now to FIG. 12, a subroutine for making a noncontiguous allocation of a cluster chain (corresponding to block 1106) will be described. At block 1202, an entry for each existing cluster in the cluster chain is created in the FAT table component 206. Each cluster will also have the flag component 806/906 set to indicate no contiguous allocations. At block 1204, an entry for each cluster to be added will be created in the FAT table component 206. At block 1206, the bitmap allocation will be updated to reflect that allocation of each cluster in the cluster chain. At block 1208, the subroutine returns.

Figure 13:
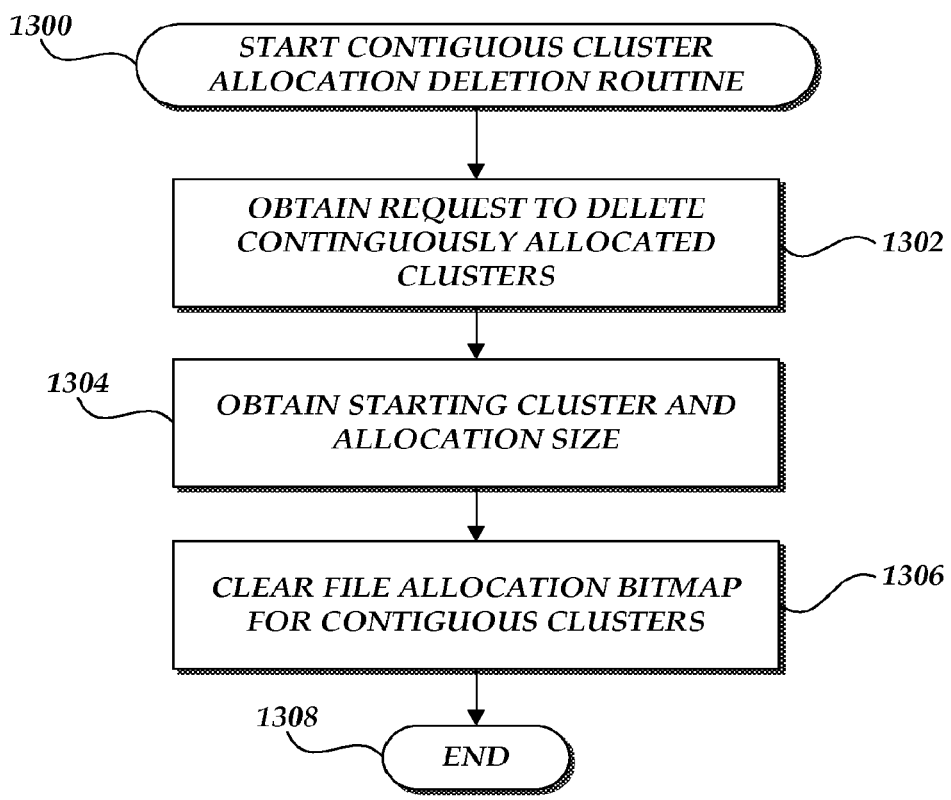
FIG. 13 is a flow diagram of a cluster chain deletion routine for an extensible file system format in accordance with an aspect of the present invention.

With reference now to FIG. 13, a routine 1300 for cluster chain deletion will be described. At block 1302, a request for extending or modifying the cluster chain is obtained. In an illustrative embodiment, the request for the extension of the cluster chain can correspond to the substitution, modification or rewriting of data. At block 1304, the starting cluster associated with the identified cluster chain is identified. Additionally, the allocation size of the cluster chain is also obtained. At block 1306, the FAT allocation bitmap entries for each cluster corresponding to the allocated cluster chain are cleared. At block 1308, the routine 1300 terminates. In an illustrative embodiment, the bitmap entries for each cluster can be cleared without having to traverse the FAT entry for each allocated cluster in the cluster chain.

While illustrative embodiments have been illustrated and described, it will be appreciated that various changes can be made therein without departing from the spirit and scope of the invention.

The embodiments of the invention in witch an exclusive property or privilege is claimed are defined as followed:

1. A computer-readable storage medium on which computer-executable instructions are stored which, when executed by a computing device, cause the computing device to:
   access a directory entry for specifying information concerning data in a file system, the directory entry containing a flag that indicates whether the data is stored in a contiguous cluster chain;
   determine that the data is stored in the contiguous cluster chain based on the flag; and
   identify each cluster in the contiguous cluster chain that stores the data without traversing a file allocation table associated with the file system based on other information within the directory entry and the determination that the data is stored in the contiguous cluster chain, the other information within the directory entry being information specifying a starting cluster and a cluster chain size.

2. A method, comprising:
   accessing a directory entry for specifying information concerning data in a file system, the directory entry containing a flag that indicates whether the data is stored in a contiguous cluster chain;
   determining that the data in the file system is stored in the contiguous cluster chain based on the flag; and
   identifying each cluster in the contiguous cluster chain that stores the data in the file system without traversing a file allocation table associated with the file system based on other information within the directory entry and the determination that the data is stored in the contiguous cluster chain, the other information within the directory entry being information specifying a starting cluster and a cluster chain size.

3. A computing device comprising a processor and memory, the processor configured to:
   access a directory entry in the memory for specifying information concerning data in a directory of a file system, the directory entry containing a flag that indicates whether the data is stored in a contiguous cluster chain;
   determine that the data in the directory is stored in the contiguous cluster chain based on the flag; and
   identify each cluster in the contiguous cluster chain that stores the data in the directory without traversing a file allocation table associated with the file system based on other information within the directory entry and the determination that the data is stored in the contiguous cluster chain, the other information within the directory entry being information specifying a starting cluster and a cluster chain size.

4. The computer-readable storage medium recited in claim 1, wherein the computer-executable instructions further cause the computing device to:
   access another directory entry for specifying information concerning other data in the file system;
   determine that the other data is not stored in another contiguous cluster chain; and
   identify the other data by traversing the file allocation table based on the determination that indicates the other data is not stored in the another contiguous cluster chain.

5. The computer-readable storage medium recited in claim 1, wherein the computer-executable instructions further cause the computing device to:
   read the data in the file system by reading from the starting cluster to an ending cluster determined from the cluster chain size.

6. The computer-readable storage medium recited in claim 1, wherein the contiguous cluster chain is associated with a plurality of contiguously allocated clusters of a storage medium.

7. The method of claim 2, further comprising:
   accessing another directory entry for specifying information concerning other data in the file system;
   determining that the other data in the file system is not stored in another contiguous cluster chain; and
   identifying the other data in the file system by traversing the file allocation table based on the determination that indicates the other data is not stored in the another contiguous cluster chain.

8. The method of claim 2, further comprising:
   reading the data in the file system by reading from the starting cluster to an ending cluster determined from the cluster chain size.

9. The method of claim 2, wherein the contiguous cluster chain is associated with a plurality of contiguously allocated clusters of a storage medium.

10. The computing device of claim 3, wherein the processor is further configured to:
    access another directory entry for specifying information concerning other data in the directory of the file system;
    determine that the other data in the directory is not stored in another contiguous cluster chain; and
    identify the other data in the directory by traversing the file allocation table based on the determination that indicates the other data is not stored in the another contiguous cluster chain.

11. The computing device of claim 3, wherein the processor is further configured to:
    read the data in the directory by reading from the starting cluster to an ending cluster determined from the cluster chain size.

12. The computing device of claim 3, wherein the contiguous cluster chain is associated with a plurality of contiguously allocated clusters of a storage medium.

* * * * *